March 20, 1951 — J. MacGREGOR — 2,546,104

FOOD WARMER

Filed May 3, 1947

INVENTOR.
JAMES MacGREGOR
BY his attys.
Stebbins, Blenko & Webb

Patented Mar. 20, 1951

2,546,104

UNITED STATES PATENT OFFICE 2,546,104

FOOD WARMER

James MacGregor, Pittsburgh, Pa.

Application May 3, 1947, Serial No. 745,887

2 Claims. (Cl. 126—377)

This invention relates to a food warmer which is primarily intended for warming and preparing food for infants. It will, therefore, be described with particular reference to this purpose although it is to be understood that it may be used for other purposes as well.

The warmer is to be used with a sauce or stew pan containing water which is heated, steam from the water heating the food and milk. It is designed so that it will fit pans of various sizes. Compartments for different types of solid food are provided as well as means for holding a bottle of milk in such a way that steam rising from the water in the pan flows around the compartments and around the upper portion of the bottle. It is thus possible to prepare a complete meal for an infant at one time and in one utensil.

In the accompanying drawings I have illustrated a present preferred embodiment of my invention in which Figure 1 is a plan view of my food warmer;

Figure 3:
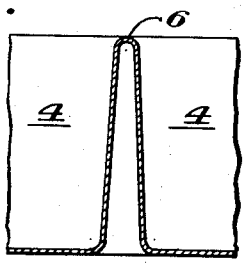
Figure 3 is a section along the lines III—III of Figure 1.

A food warmer constructed in accordance with my invention is designed to rest upon the edge of a stew or sauce pan and to cover the pan except for a limited open area in which a baby's bottle may be placed. It comprises several compartments 4 which extend down into the pan from a rim 5 which supports the warmer on the pan. The rim and compartments may all be stamped from a single sheet of metal, the metal being doubled downwardly along radii of the warmer to form partitions 6 between the compartments. (See Figure 3.) The inner walls 7 of the compartments 4 are bent over at their uppermost portions to form an inner rim 8 defining a central aperture 9 in which a milk bottle may be placed. The diameter of the aperture 9 should be slightly greater than the diameter of the average infant's milk bottle so that steam from water heated in the pan can flow out of the aperture around the bottle.

A plurality of channels 10 are stamped in the rim 5 so that an effective seal can be obtained between the rim and the edges of pans of various diameters. Each channel forms a complete circle around the rim, each circle having a different diameter. All of the channels coincide at one point 11 on the periphery of the rim. Since the circular channels 10 are of different diameters they diverge from this one point, the rim therefore increasing until it obtains its maximum width at a point diametrically opposed to the point 11.

Figure 1:
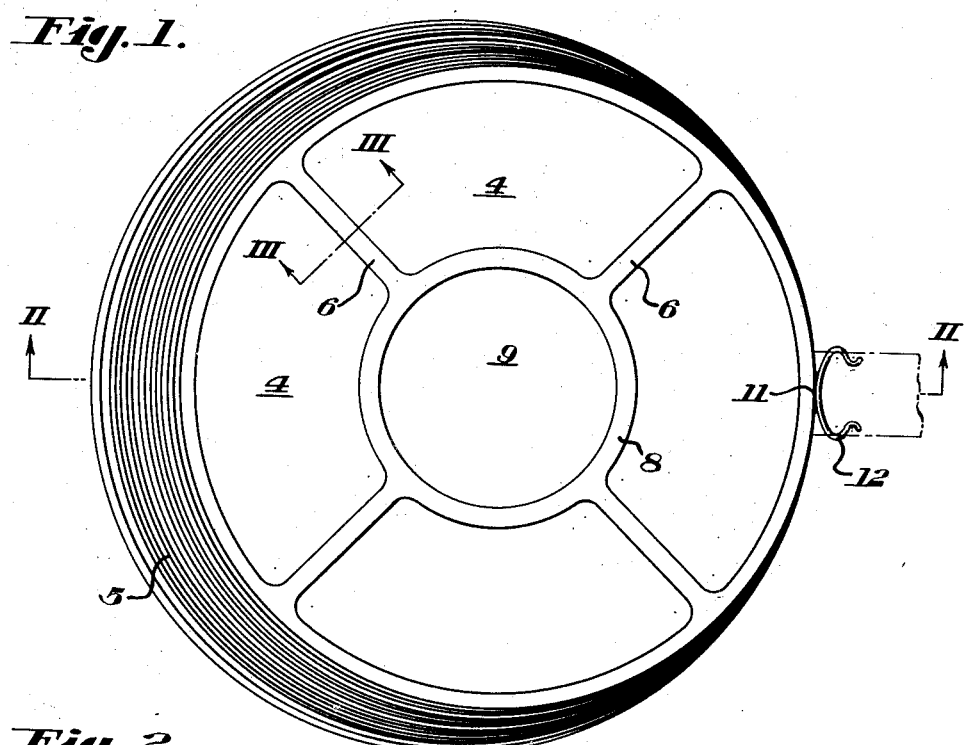
Figure 2:
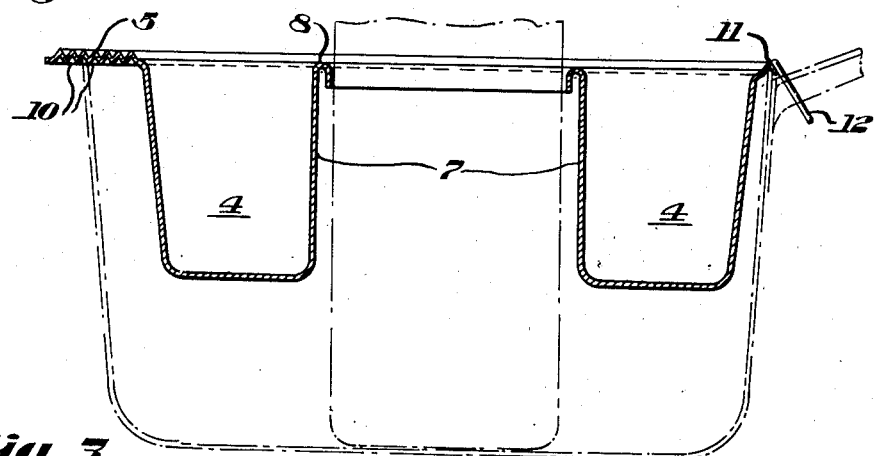
Figure 2 is a section along the lines II—II of Figure 1.

The warmer is placed on a pan so that the handle of the pan is nearest to the point 11, the edge of the pan fitting within whichever of the channels 10 has the same diameter as the pan. (See Figure 2.) Offsetting of the channels 10 as described permits the warmer to be used with a variety of pans and at the same time provides a narrow rim at one point on the periphery of the warmer which will clear an upturned handle such as that shown in chain lines in Figure 2 which otherwise would hold the warmer above the edge of the pan. The pan is thus effectively sealed around its edge and most of the steam rising from water being heated in the pan flows around the compartments 4 and out through the aperture 9.

A spring clip 12 is fastened to the rim 5 of the food warmer at the point 11 where the channels 10 coincide. This clip may be forced down around the handle of a pan when the warmer is placed on the pan and helps to prevent steam pressure from moving the warmer around on the pan.

A different type of food can be heated in each of the compartments 4 of my warmer and at the same time a bottle of milk may be warmed by placing it in the aperture 9. The rim 8 of the aperture holds the bottle in place and causes steam rising from water heated in a pan on which the warmer has been placed to flow past the bottle.

My food warmer is a great convenience for feeding infants. All of the different foods making up one meal can be prepared or heated at one time along with a bottle of milk. When the infant is actually being fed the warmer can be removed from the pan and all of the food for the meal can be placed in front of him at one time and in one dish. It may be stamped from a single piece of metal and can therefore be easily cleaned since there are no seams from which it is difficult to remove food. The metal can be enameled or the entire warmer can be made of glass.

While I have described a present preferred embodiment of my invention, it is to be distinctly understood that it may be otherwise embodied within the scope of the following claims.

I claim:

1. A food warmer of sheet material having a flat annular portion to support the warmer on the edge of a pan, the sheet being bent downwardly along the inner diameter of the flat portion to form the outer walls of compartments adapted to extend down into the pan, said sheet being bent laterally towards the center of the warmer to form the bottoms of said compartments, and upwardly to form the inner walls of said compartments, the portion of the sheet forming the bottoms also being bent upwardly from the bottoms along radii of the warmer and then downwardly to the bottoms to form side walls for said compartments extending between said inner and outer walls, the inner walls also being spaced to define an aperture through which articles may be placed in the pan.

2. A food warmer of sheet material having a flat annular portion to support the warmer on the edge of a pan, the sheet being bent downwardly along the inner diameter of the flat portion to form the outer walls of compartments adapted to extend down into the pan, said sheet being bent laterally towards the center of the warmer to form the bottom of said compartments, and upwardly to form the inner walls of said compartments, the portion of the sheet forming the bottoms also being bent upwardly from the bottoms along radii of the warmer and then downwardly to the bottoms to form side walls for said compartments extending between said inner and outer walls, the inner walls also being spaced to define an aperture through which articles may be placed in the pan, and means for holding the warmer on the pan.

JAMES MacGREGOR.

REFERENCES CITED

The following references are of record in the file of this patent:

UNITED STATES PATENTS

| Number | Name | Date |
|---|---|---|
| 223,267 | Ashcroft | Jan. 6, 1880 |
| 656,684 | Wiley | Aug. 28, 1900 |
| 1,148,634 | Stricker | Aug. 3, 1915 |
| 1,277,253 | Paschal | Aug. 27, 1918 |
| 1,441,712 | Picard | Jan. 9, 1923 |
| 1,938,185 | Larsen | Dec. 5, 1923 |
| 2,022,152 | Roedl | Nov. 26, 1935 |

FOREIGN PATENTS

| Number | Country | Date |
|---|---|---|
| 204,526 | Great Britain | Oct. 4, 1923 |
| 131,546 | Switzerland | May 1, 1929 |